Figure 1:
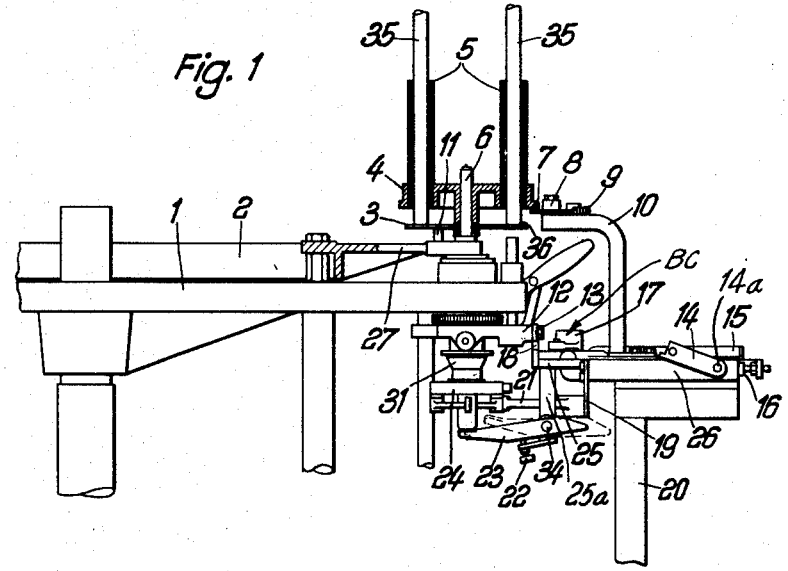

Dec. 18, 1962    J. DICHTER    3,069,047
GLASS TUBE FEEDING MACHINE
Filed Dec. 1, 1958    3 Sheets-Sheet 1

Inventor:
Jakob Dichter
Attorneys:
Mead, Browne, Schuyler & Beveridge

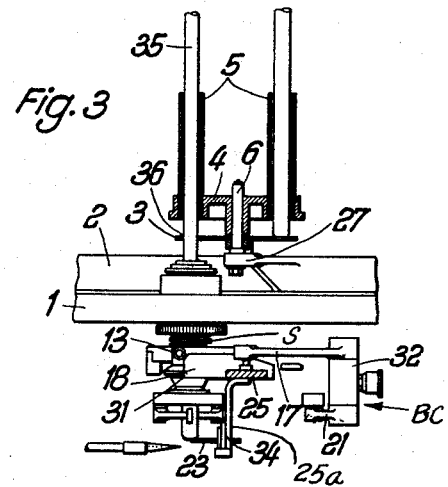
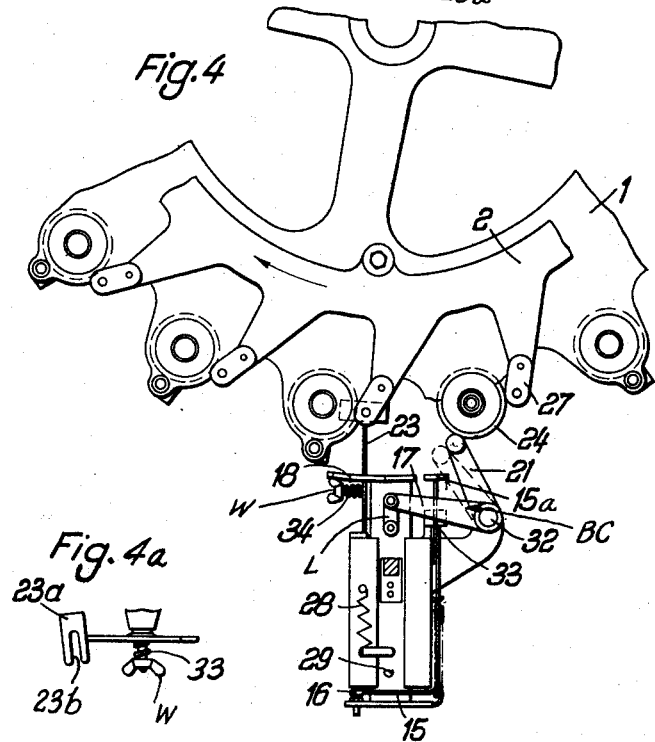

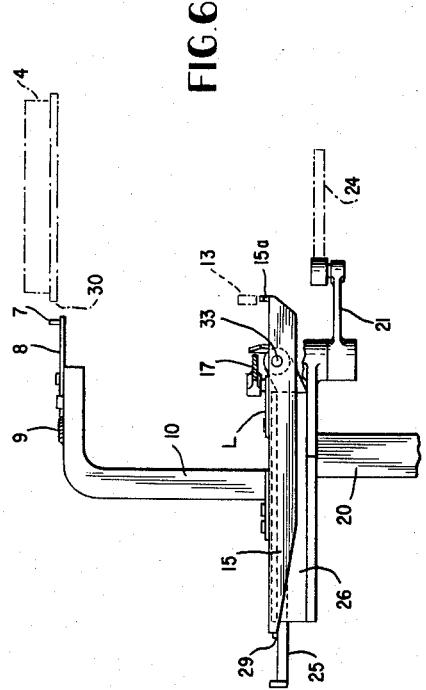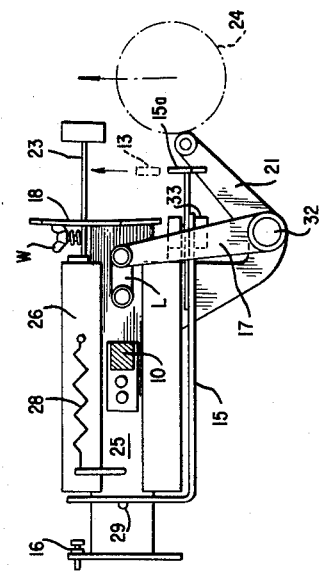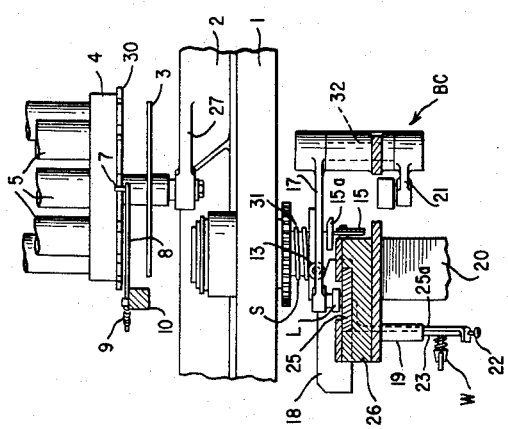

3,069,047
GLASS TUBE FEEDING MACHINE
Jakob Dichter, Saschsendamm 93,
Berlin-Schoneberg, Germany
Filed Dec. 1, 1958, Ser. No. 777,357
Claims priority, application Germany Dec. 6, 1957
8 Claims. (Cl. 221—9)

The present invention relates to a mechanism for automatically feeding glass tubes to the tube supporting heads of a glass working machine wherein a plurality of identical heads are mounted around a vertical column and are passed in succession through stations which perform the glass working operations. Such operations are done while the glass tubes are held in vertical position, commencing with the exposed lower ends of the tubes and continuing in a direction toward their other ends, whereby the completed product is separated from the tube stock and the latter is advanced for another sequence of operations. When the entire length of tube stock is utilized and its last end removed from the chuck arrangement, the machines have heretofore required a new tube from a magazine to be manually or mechanically inserted into the supporting heads.

In certain types of machines the feeding mechanism cooperates with the opening and closing devices of the chuck in such a manner that the advance of the tube is effected when the chuck is empty. The scanning of the empty chuck is carried out by conventional means; so is the operation of the tabulating devices that determine the efficiency of the machines.

It has already been proposed to first drop the glass tubes through the perforate sleeves of the supporting heads onto the closed gripper jaws and afterwards, upon reaching the station in which the tubes are displaced against an abutment plate, push them a further distance.

The perforate sleeves of the supporting heads are of considerable length so that the dropping of the tube upon the unyielding chuck arrangement positioned at the lower end thereof has met with many difficulties.

Since the ends of the tubes are seldom smooth but have jagged edges, the dropping of the tube against the gripping jaws results in breakages that seriously limit the production capacity of the machine. Moreover, a tube which is dropped only as far as the gripping jaws, i.e. which only penetrates the supporting head and does not extend into the region of the heating burners, receives less heat in the length used for the first article being manufactured than in the succeeding ones which have heat transferred to them from the previously shaped article. This results in faulty production and, consequently, lower capacity of the machine.

The present invention overcomes thed rawbacks of heretofore known machines and provides other important advantages.

The invention relates to a method for carrying out the mechanical operation of a machine wherein a glass tube, upon being preliminarily provided outside of the machine with a bottom, a spear-shaped edge or a smooth edge in a manner compatible with the body of the tubular glass member being shaped, is vertically inserted into an apertured storage device which is brought into alignment with the perforate sleeves of the supporting heads, permitting the glass tube to drop therein. To this end the gripper jaws of the supporting head are opened and the glass tube falls through the supporting head onto a resilient abutment positioned below said gripper jaws and provided with a brake coupling with the aid of which the gravitational energy of the tube is not retained but rather annulled. This prevents the rebounding of the tube and the attendant inaccuracies in the delivery thereof.

The brake coupling is controlled by adjustment of the frictional pressure in accordance with the particular weight of the tubes, and the abutment plate is limited in its end position by an adjusting screw. This assures that the drop carries the tubes to an exact end position in relation to the burners that follow.

This position is selected in such a manner that the burners heat the end of the tube only to the extent necessary for the transfer of heat along the glass tubes to the succeeding articles undergoing shaping.

The drop of the tube results in the withdrawal of the resilient abutment against the stop screw. It is then forcibly brought back to its initial position, upon overcoming the brake coupling, and is moved away from the path of travel of the glass tubes.

When a fresh tube is substituted for a new succession of the steps described above, the resilient abutment is simultaneously moved back underneath the opening of the gripping jaws so that the glass tube can fall thereupon.

Further details and features of the invention will result from the following description of appended drawings embodying by way of example a machine for making ampules.

Figure 2:
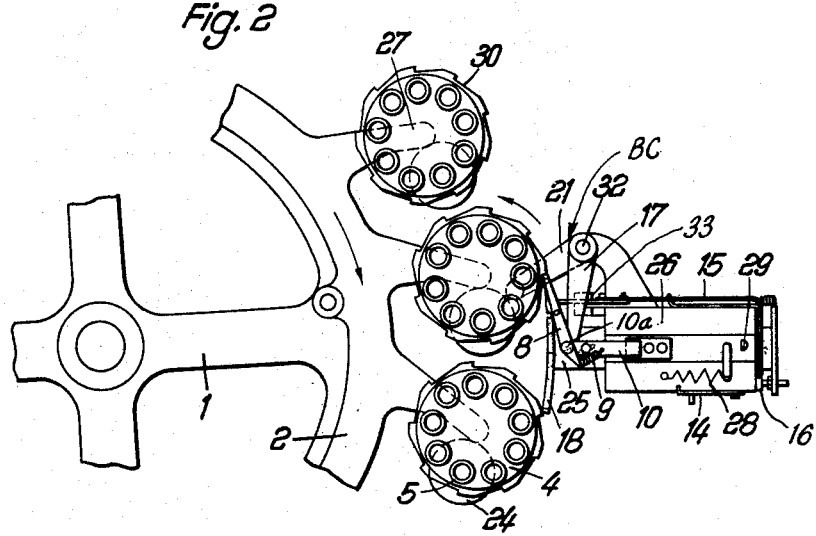

FIG. 1 shows a side elevational view of the machine.
FIG. 2 is a top view of the machine.
FIG. 3 shows details of the drum-magazine mechanism,
FIG. 4 is a top view of the latter,
FIG. 4a is a partial top plan view showing details of a variant form of catch arm,
FIG. 5 is a transverse cross-sectional view taken on a vertical plane passing through block 26 and looking toward the spider,
FIG. 6 is a side elevational view of the feeding mechanism taken from the side opposite that of FIG. 1 with certain parts omitted or broken away for the sake of clarity, and
FIG. 7 is a top plan view of the feeding mechanism with portions of the spider and chuck assembly omitted and others shown in broken line.

The apparatus and method embodying the present invention are adapted for employment on conventional glass forming machines of well known construction and thus only those portions of the machine necessary for a complete understanding of the invention have been disclosed in the drawings. Typical examples of machines to which the invention is adapted are those disclosed in my prior Patents 2,050,088; 2,199,322; and 2,282,993 to which reference may be had for structural details of the forming machine which have been omitted from the present disclosure in order to more clearly identify the invention. Referring now to the drawings, a typical machine of this type includes a spider 1 suitably supported for rotation on a vertical axis and having an annular magazine support 2 secured thereon. The outer periphery of magazine support 2 is formed with a plurality of outwardly projecting arms 27, each arm 27 having a vertical shaft 6 projecting upwardly from its outer end. Each shaft 6 rotatably supports a drum magazine 4 provided with a plurality of vertically extending open-ended tube holders 5. As best seen in FIGS. 1 and 3, each of tube holders 5 is adapted to support a glass tube 35 in a vertical position. Tubes 35 project downwardly from the bottoms of tube holders 5 and their lower ends rest upon the surface of a circular plate 3 which is centered upon shaft 6 but held against rotation by means of a peg 11 which connects plate 3 to arm 27.

An open-ended chuck 31 is supported from spider 1 below each magazine 4. The chucks 31 shown in the application drawings are completely conventional and are of the same construction as the various chucks shown in my previously issued patents mentioned above. For further details concerning the chucks 31, reference may be had to my prior Patent No. 1,981,692. For the sake of clarity, details of chuck 31 have been omitted from FIGS. 2, 4, 6 and 7. However, each chuck includes a circular flange 24 concentric with the central axis of the chuck and, as best seen in FIG. 2, the central opening of the chuck is located to be aligned with the designated tube holder 5 on the lowermost magazine 4 shown in FIG. 2. Plate 3 is concentric with the magazine 4 last referred to and is formed with an opening 36 vertically aligned with the designated tube holder 5 of FIG. 2 and the opening of the associated chuck 31. Thus, glass rods such as 35 in FIG. 1 are supported in their respective tube holders by plate 3 at all positions except the tube holder which is in vertical alignment with the chuck opening. At the particular tube holder 5 in alignment with the chuck opening, the glass rod 35 is free to drop downwardly through bore 36 in plate 3 into and pass through the opening of the chuck as shown by the leftwardmost rod 35 of FIG. 3.

To control the individual chucks 31 and to accurately position the glass tubes 35 in position to be acted upon by the chucks, a control mechanism is mounted upon a fixed frame 20 (FIG. 1) adjacent the circular paths traversed by the chucks during rotation of spider 1. The purpose of the mechanism about to be described is primarily to insert a fresh tube into a chuck 31, if required, the working of the tube in step-by-step operations being performed at subsequent stations, not shown (see for example my prior Patents Nos. 2,050,088; 2,199,332 and 2,282,993).

To this end, the control mechanism includes a fixed block 26 mounted upon frame 20 and constructed to support a slide member 25 for reciprocating movement within block 26 between an inner or operative position as shown in FIGS. 2 and 4 and an outer or retracted position as shown in FIGS. 6 and 7. At its inner or forward end, slide 25 carries a chuck operating cam 18 which, as best seen in FIGS. 2 and 7, is curved to correspond to the circular path of rollers 13 mounted upon operating yokes 12 of the respective chucks 31. In the drawings, slide 25 is shown at its forwardmost limit of movement in FIGS. 1, 2, 4 and 5, at which time the upper surface of cam 18 lies on the circumferential path traversed by the chuck operating roller 13. When slide 25 is at its retracted position, as shown in FIGS. 6 and 7, cam 18 is withdrawn radially outwardly from the circular path traversed by the chuck operating rollers 13. If desired, slide 25 may be manually latched at its rearwardmost limit of movement by swinging a latch 14 pivotally mounted on block 26 by a pin 14a into a latching position engaged with blocking yoke 15. The forwardmost limit of movement of slide 25 relative to block 26 is adjustably determined by the engagement between a set screw 16 threadably supported in a projection on slide 25 and the rearward end of block 26. Slide 25 is driven from its forward limit of movement to its rearwardmost limit by means of an offset bell crank assembly designated generally BC which is pivotally supported from fixed frame 20 for rotation about the axis of its central shaft 32. The vertical extent of shaft 32 is best appreciated in FIGS. 3 and 5, one arm 17 of the bell crank being mounted at the upper end of shaft 32, the other arm 21 being mounted at the lower end of the shaft. Arms 21 and 17 are rigidly connected to the rotary shaft so that rotary movement of arm 21 causes a like rotary movement of arm 17.

Arm 21 is positioned to engage, when slide 25 is in its forward limit of movement, flange 24 of an approaching chuck 31. Engagement between the flange 24 of the approaching chuck and arm 21 causes arm 21 to be rotated about the axis of shaft 32 in a counterclockwise direction from the full line position of FIG. 4 to the position of FIG. 7. This movement of arm 21 causes a similar angular movement of arm 17. Arm 17 is coupled to slide 25 as by a pivoted link L and hence the aforementioned angular movement of arm 17 moves slide 25 outwardly (to the right in FIG. 2) away from the rotating spider 1 to the retracted position of FIGS. 6 and 7.

An upstanding lug 29 is fixedly mounted upon slide 25 and is so located as to pass beneath a blocking yoke 15 which drops in front of lug 29 to latch slide 25 at its outer limit of movement. Blocking yoke 15 is pivotally supported from the fixed block 26 at a pivot assembly 33 (FIGS. 4 and 6). Since arm 17 is coupled to slide 25, when slide 25 is latched in its retracted position arm 21 is disposed clear of the path of the flanges 24 of the various chucks (FIG. 7).

To vertically locate glass rods 35 within their respective chucks, a catch arm 23 is pivotally supported from a depending portion 25a of slide 25 for movement about a horizontal axis. The pivotal coupling between catch arm 23 and slide 25 takes the form of a spring-biased frictional coupling 34 (FIG. 4) which may be adjusted by the illustrated wing nut W to exert varying degrees of frictional resistance to pivotal movement of catch arm 23 relative to slide 25. An adjustable stop screw 22 (FIG. 1) may be positioned to define the downward limit of movement of the operating end of catch arm 23 about the axis defined by the frictional pivot assembly 34. As best seen in FIG. 1, the lefthand end of catch arm 23 is positioned to engage the lower end of the glass tube, when slide 25 is at its forward limit of movement. The tube-engaging portion of catch arm may be formed as at 23a with a slot 23b (FIG. 4a) open on the outlet side to accommodate tubes necked at the end as in the formation of double-necked ampules.

Mechanism for rotating magazines 4 in step-by-step rotation about the shafts 6, as required, includes a pedestal 10 mounted upon slide 25 for movement with the slide. At the upper end of the pedestal 10, an indexing arm 8 is pivotally supported upon the pedestal and is provided with a pin 7 (see FIG. 1) at its outer end located to engage the notches in the magazines when slide 25 is at its forward limit of movement. Arm 8 is resiliently biased toward the magazines 4 by a tension spring 9. A stop 10a illustrated immediately above the spring 9 in FIG. 2 limits pivotal movement of arm 8 on pedestal 10.

It should be borne in mind that normally slide 25 is latched in its fully retracted position by blocking yoke 15 and operates only to position a magazine approaching the station at which the control mechanism is located to locate a fresh glass tube 35 in a chuck 31 which is empty. A chuck approaching the station at which the control mechanism is located and having a glass tube engaged within the chuck will not be operated upon by the control mechanism. While chuck 31 is of quite conventional construction, certain portions of the chuck are employed to actuate the control mechanism. Thus, before describing the operation, a brief review of the chuck is desirable.

The jaws (not shown) of chuck 31 are opened or closed by means of yoke 12. Chuck 31 includes a spring S, FIG. 3, which normally biases yoke 12 downwardly to the chuck closing position. It is believed apparent that if chuck 31 is completely empty, chuck operating spring S will bias yoke 12 to its lowermost limit of movement since there is nothing to interfere with the complete closing of the chuck jaws. If a glass tube is received within the chuck, the spring S will bias the operating yoke toward a chuck closing position. However, the total downward movement of yoke 12 will be less since the jaws will engage the glass tube before moving to their completely closed position.

Thus, referring to FIG. 3, roller 13 on chuck yoke 12 is shown in the approximate position which it assumes when the chuck is closed and a glass tube is gripped by the chuck jaws. Since the chuck jaws are not fully closed, the chuck yoke 12 and hence roller 13 are maintained at a location somewhat above their lowermost limit of movement, and cam 15a is vertically located with respect to the chuck so that when a glass tube is gripped in the chuck jaws, the chuck operating roller 13 is vertically located to pass freely above the surface of cam 15a as shown in FIG. 6. If no tube is within chuck 31, roller 13 would be at a somewhat lower position than that shown in FIG. 3. With no tube held by the chuck jaws, the roller 13 is at a lower position, since chuck operating yoke 12 is at its extreme limit of downward movement. The position of roller 13 when the chuck is empty is such that roller 13 is located below the position shown in FIG. 6 and, upon traversing the position of cam 15a, engages the cam and depresses the right hand end of yoke 15 a sufficient amount to pivot the yoke about pivot 33 to elevate the left hand end of yoke 15, as viewed in FIG. 6, a sufficient distance to disengage the blocking yoke from latch 29.

Operation of the mechanism is as follows. As a starting condition, it will be assumed that slide 25 is in its normal or fully retracted position shown in FIGS. 6 and 7. Spider 1 is driven in continuous rotation and thus successively advances the chucks and their associated magazine units past the station at which the feeding mechanism is located. If a chuck 31 having a glass tube gripped in the chuck jaws approaches the feeding mechanism, the flange 24 of the chuck clears the outer end of arm 21 as shown in FIG. 7, while the operating roller 13 of the chuck passes freely above cam 15a and radially inwardly of chuck operating cam 18 as shown in FIGS. 6 and 7. Thus, when a loaded chuck is advanced to the feeding station, no feeding action occurs since slide 25 remains in its fully retracted position.

When an empty chuck approaches the feeding station, however, the glass feeding mechanism is actuated to dispense a glass tube from the associated magazine of the empty chuck and to accurately locate the tube vertically within the chuck jaws. This action is initiated by the engagement of the chuck operating roller 13 with cam 15a. As described above, this engagement occurs because the chuck is empty and hence its actuating yoke 12 and roller 13 have been biased downwardly by the chuck operating spring S to a position where the roller 13 engages and depresses cam 15a as the chuck assembly is rotated past the feeding mechanism. The depression of cam 15a by the lowered roller 13 of the empty chuck pivots blocking yoke 15 in a counterclockwise direction about pivot 33 as viewed in FIG. 6, and this pivotal movement lifts the leftward end of blocking yoke 15 upwardly to a position clear of latch lug 29 on slide 25. As soon as lug 29 is disengaged from blocking yoke 15, spring 28 resiliently biases slide 25 radially inwardly toward the center of the spider to shift cam 18 into circumferential alignment with cam 15a, this position being shown in FIG. 2. As spider 1 continues to rotate, roller 13 is carried past cam 15a and engages the upwardly inclined leading end of cam 18, this particular phase of the operation being shown in FIG. 5. Since cam 18 is fixedly mounted upon the inner end of slide 25, it is held against vertical movement, and the rotative advance of the spider and chuck causes roller 13 to be driven upwardly, thus lifting chuck operating yoke 12 and thereby opening the chuck jaws to their fully opened position in readiness to receive a tube from magazine 5.

The tube is dispensed from the tube magazine into the opened chuck by the action of the ratchet assembly which includes arm 8 mounted upon the upper end of support 10. Support 10 is fixedly mounted upon slide 25, and hence the movement of slide 25 to its forward or operative position carries finger 7 into the path of movement of ratchet 30 on the magazine associated with the empty chuck. The rotative advance of the magazine by rotation of spider 1 causes finger 7 to rotate the magazine one step to drive a load support tube 5 into vertical alignment with the opening 36 in plate 3. As soon as the glass tube in the support tube arrives over the opening 36, it drops freely downwardly and passes through the fully opened chuck. At this particular time, roller 13 is traversing the flat upper portion of cam 18—i.e., it has moved to the left from the FIG. 5 position. The glass tube drops freely through the opened chuck and drops downwardly until its lower end strikes catch arm 23 which has been moved into vertical alignment with the path of the chuck jaws by the advance of slide 25 to its forward limit of movement. At this time, catch arm 23 is at its upper limit of movement, but is free to move downwardly against the resistance developed by frictional brake assembly 34 until arm 23 engages its stop 22. This action brings the free vertical drop of the glass tube to a frictionally controlled cushioned stop, thereby preventing the glass tube from vertically rebounding or from shattering, as might be the case if the tube engaged a vertically fixed stop member.

Further rotation of spider 1 carries the chuck assembly to the left, as viewed in FIG. 5, until roller 13 drops from the left hand end of cam 18. When roller 13 passes beyond cam 18, spring S drives the chuck jaws toward their closed position to grip the glass tube which has been accurately vertically positioned within the chuck by catch arm 23.

As the next succeeding chuck assembly approaches the feeding mechanism, the flange 24 of chuck assembly engages the outer end of arm 21 to rotate the arm in a counterclockwise direction as from the position of FIG. 2 to the position of FIG. 7. This action drives slide 25 from its forward limit of movement shown in FIG. 2 to its normal retracted position of FIG. 7, where the slide is latched by the engagement between blocking yoke 15 and lug 29 on slide 25. During this retracting movement, the outer end (right hand end of FIG. 1) of catch arm 23 moves into engagement with the lower end of member 19 and, as slide 25 moves toward its fully retracted positioned, catch arm 23 is rotated to lift its inner end upwardly into the ready position as the right hand of the arm passes under the fixed member 19.

If the next succeeding chuck is empty, its roller 13 engages and depresses cam 15a to repeat the cycle of movement described above. If the next succeeding chuck has a glass tube disposed within the chuck, its roller 13 passes freely above cam 15a and no actuation of the feed mechanism occurs.

While I have described but one embodiment of my invention, it will be apparent to those skilled in the art that the disclosed embodiment may be modified. Therefore, the foregoing description is to be considered exemplary rather than limiting and the true scope of my invention is that defined in the following claims.

I claim:

1. Apparatus for vertically feeding glass tubes into a glass working machine comprising an open ended chuck, a magazine for maintaining a supply of glass tubes in vertical positions above said chuck, a movable catch arm assembly located vertically below said chuck, means responsive to the absence of a tube in said chuck for opening said chuck and releasing a tube from said magazine to drop downwardly through said chuck onto said catch arm assembly, means supporting said catch arm assembly for movement between a normal elevated position and a lower limit, and brake means for resisting movement of said catch arm assembly from said elevated position to said lower limit to bring the dropped tube to a controlled stop at a selected position wherein the upper portion of said dropped tube is located within said chuck.

2. Apparatus as defined in claim 1 wherein said brake means comprises an adjustable frictional coupling between said catch arm and said supporting means.

3. Apparatus as defined in claim 1 including means for supporting and moving said chuck along a predetermined horizontal path, said responsive means including means for supporting and moving said catch arm assembly into and out of a position below said horizontal path, and a segmental plate on said catch arm assembly engageable with the lower end of said dropped tube, said plate being horizontally elongated in a direction extending along the path of movement of said chuck.

4. Apparatus as defined in claim 3, said plate having an elongated slot therein narrower than the diameter of a glass tube extending along said path and opening in the direction of movement of said chuck along said path.

5. Apparatus for vertically feeding glass tubes into a glass working machine comprising an open ended chuck, a magazine for maintaining a supply of glass tubes in vertical positions above said chuck, a slide member, means mounting said slide member for movement toward and away from said chuck between a forward limit and a rearward limit, a catch arm on said slide member located to be positioned below said chuck when said slide member is located at its forward limit of movement, means pivotally supporting said catch arm on said slide member for movement about a horizontal axis, means on said slide member mounting means for pivotally elevating said catch arm upon movement of said slide member toward said rearward limit of movement, means normally maintaining said slide member at said rearward limit of movement, means responsive to the absence of a tube in said chuck for driving said slide member to said forward limit of movement, opening said chuck, and releasing a tube from said magazine to drop through said chuck onto said catch arm to drive said arm in downward pivotal movement, means for resisting downward pivotal movement of said catch arm to bring a tube dropped thereupon to a controlled stop at a selected vertical position wherein the upper portion of said tube is located within said chuck, means for closing said chuck to grip said tube, and means for moving said slide member to said rearward limit of movement after said chuck has gripped said tube.

6. Apparatus as defined in claim 5 wherein said means for resisting downward pivotal movement of said catch arm comprises a frictional coupling between said arm and said slide member, and means for adjusting said frictional coupling to exert a selected resistance to pivotal movement of said catch arm.

7. Apparatus as defined in claim 6 including an adjustable stop on said slide member engageable with said catch arm to define a lower limit to pivotal movement of said arm upon said slide member.

8. Apparatus for vertically feeding glass tubes into a glass working machine comprising an open ended chuck, a spider supporting said chuck for movement about a vertical axis, a magazine mounted upon said spider above said chuck for maintaining a supply of glass tubes in vertical positions above said chuck, a frame located adjacent the path of movement of said chuck about said vertical axis, a slide member mounted upon said frame for movement toward and away from the path of said chuck between a forward limit adjacent said path and a rearward limit remote from said path, a catch arm mounted on said slide member and located to be positioned below said chuck when said slide member is located at its forward limit of movement, means pivotally supporting said catch arm on said slide member for movement about a horizontal axis, means normally maintaining said slide member at said rearward limit of movement, means operable when said slide member is at said rearward limit of movement to position said catch arm at an elevated position upon said slide member, means operable by said chuck when said chuck is empty for rendering said maintaining means ineffective to maintain said slide member at said rearward limit of movement and for driving said slide member to said forward limit of movement, means on said slide member operable at said forward limit of movement to open said chuck, means on said slide member for actuating said magazine to release a tube from said magazine to drop through said opened chuck and onto said catch arm in said elevated position to drive said arm in downward pivotal movement, means resisting downward pivotal movement of said catch arm to bring a tube dropped thereupon to a controlled stop at a selected vertical position wherein the upper portion of said tube is located within said chuck, means for closing said chuck to grip the upper portion of said tube, and means for moving said slide member to said rearward limit of movement after said chuck has gripped said tube.

References Cited in the file of this patent

UNITED STATES PATENTS

| | | |
|---|---|---|
| 734,734 | McBerty et al. | July 28, 1903 |
| 805,322 | Ridings | Nov. 21, 1905 |
| 932,645 | Smith | Aug. 31, 1909 |
| 1,546,352 | Rippl | July 14, 1925 |
| 1,914,205 | Hooper et al. | June 13, 1933 |
| 1,981,692 | Dichter | Nov. 20, 1934 |
| 2,050,088 | Dichter | Aug. 4, 1936 |
| 2,199,332 | Dichter | Apr. 30, 1940 |
| 2,203,287 | Smith | June 4, 1940 |
| 2,273,948 | Forslund et al. | Feb. 24, 1942 |
| 2,278,013 | Nicholson | Mar. 31, 1942 |
| 2,282,993 | Dichter | May 12, 1942 |
| 2,297,149 | Houck et al. | Sept. 29, 1942 |
| 2,433,076 | Weckstein | Dec. 23, 1947 |
| 2,542,067 | Waite et al. | Feb. 20, 1951 |
| 2,675,647 | Roeber | Apr. 20, 1954 |
| 2,746,128 | Barron et al. | May 22, 1956 |

FOREIGN PATENTS

| | | |
|---|---|---|
| 1,139,120 | France | June 25, 1957 |